(12) United States Patent
Mazzocchi, Jr. et al.

(10) Patent No.: US 11,848,582 B2
(45) Date of Patent: Dec. 19, 2023

(54) MOBILE DEVICE CHARGING APPARATUS

(71) Applicant: POWER PULL GROUP INC., Elmont, NY (US)

(72) Inventors: Gary Mazzocchi, Jr., Elmont, NY (US); Thomas Cipolla, Jr., Island Park, NY (US)

(73) Assignee: POWER PULL GROUP INC., Elmont, NY (US)

( * ) Notice: Subject to any disclaimer, the term of this patent is extended or adjusted under 35 U.S.C. 154(b) by 0 days.

(21) Appl. No.: 18/118,054

(22) Filed: Mar. 6, 2023

(65) Prior Publication Data
US 2023/0208164 A1 Jun. 29, 2023

Related U.S. Application Data (63) Continuation-in-part of application No. 17/038,697, filed on Sep. 30, 2020, now Pat. No. 11,601,000.
(Continued)

(51) Int. Cl.
*H01M 10/46* (2006.01)
*H02J 7/00* (2006.01)
(Continued)

(52) U.S. Cl.
CPC ............ *H02J 7/0042* (2013.01); *A45C 11/00* (2013.01); *H02J 7/14* (2013.01); *H02K 7/1853* (2013.01); *A45C 2011/002* (2013.01)

(58) Field of Classification Search
CPC ........ H02J 7/0042; H02J 7/14; H02K 7/1853; A45C 11/00; A45C 2011/002
(Continued)

(56) References Cited

U.S. PATENT DOCUMENTS 4,360,860 A * 11/1982 Johnson .................. F21L 13/06
362/183
3,093,731 A1 1/2012 Bulthaup
(Continued)

FOREIGN PATENT DOCUMENTS

CN 205504587 8/2016
JP 2023042488 A * 3/2023
(Continued)

*Primary Examiner* — Edward Tso
(74) *Attorney, Agent, or Firm* — SHORE IP GROUP, PLLC; Sean R. Wilsusen, Esq.

(57) ABSTRACT

A mobile device charging apparatus includes a mobile device case including an electrical adapter configured to connect with a charging port of a mobile device. A gearbox is arranged in the case. The gearbox includes interconnected gears configured to generate electrical energy by rotating the interconnected gears. A mechanical crank is configured to rotate the interconnected gears of the gearbox to generate the electrical energy. A printed circuit board (PCB) is in electrical communication with the gearbox. The PCB is in electrical communication with the electrical adapter. A battery is in electrical communication with the PCB. The battery is configured to store the electrical energy generated by rotating the interconnected gears of the gearbox. The PCB is configured to charge the mobile device by transferring the stored electrical energy from the battery to the electrical adapter configured to connect with the charging port of the mobile device.

20 Claims, 11 Drawing Sheets

Related U.S. Application Data (60) Provisional application No. 62/908,334, filed on Sep. 30, 2019.

(51) Int. Cl.
  *H02K 7/18* (2006.01)
  *H02J 7/14* (2006.01)
  *A45C 11/00* (2006.01)

(58) Field of Classification Search
  USPC ............... 320/101, 107, 114, 115, 132, 148; 290/1 R, 14, 16, 50, 53, 54
  See application file for complete search history.

(56) References Cited

U.S. PATENT DOCUMENTS

| | | | | |
|---|---|---|---|---|
| 2007/0285053 | A1* | 12/2007 | Noguchi | H02J 7/32 320/114 |
| 2009/0033100 | A1* | 2/2009 | Dai | H02K 7/1853 290/1 C |
| 2009/0115367 | A1* | 5/2009 | Kidakam | H02J 7/0042 320/101 |
| 2011/0148422 | A1* | 6/2011 | Tozun | F21S 9/037 320/101 |
| 2013/0088189 | A1* | 4/2013 | Emerson | H02K 7/1861 320/107 |
| 2015/0185771 | A1* | 7/2015 | Clark | H02K 7/1861 307/154 |
| 2015/0194833 | A1 | 7/2015 | Fathollahi | |
| 2015/0207360 | A1 | 7/2015 | Adams | |
| 2016/0118861 | A1* | 4/2016 | Gabriel | H02J 7/0044 290/1 R |
| 2021/0057963 | A1* | 2/2021 | Weinberger | F03G 5/06 |

FOREIGN PATENT DOCUMENTS

| | | | |
|---|---|---|---|
| KR | 20060025334 | 3/2006 | |
| WO | WO-0103269 A1 * | 1/2001 | H02J 7/32 |

* cited by examiner

MOBILE DEVICE CHARGING APPARATUS

CROSS-REFERENCE TO RELATED APPLICATION

This U.S. Non-Provisional patent application is a Continuation-In-Part of U.S. patent application Ser. No. 17/038,697, filed on Sep. 30, 2020, which issues as U.S. Pat. No. 11,601,000 on Mar. 7, 2023, and which claims priority to U.S. Provisional Patent Application No. 62/908,334, filed on Sep. 30, 2019, the disclosure of which is incorporated by reference herein in its entirety.

BACKGROUND

Technical Field

The present disclosure relates to a charging apparatus, and more particularly, to a mobile device charging apparatus.

Discussion of Related Art

Mobile devices, such as Smartphones and Tablet computers employ rechargeable batteries configured to power the mobile devices. The rechargeable batteries are generally plugged into a source of electrical energy such as a wall outlet to charge the battery. As an example, daily charging of such rechargeable batteries is often necessary to provide the needed power to operate the mobile devices.

At times, such as during a power outage resulting from a natural disaster or flaws in an electrical grid, a source of electrical energy might not be available. For example, following a natural disaster, the power grid may be out for a period or days or weeks, or electrical power may be only intermittently available. Accordingly, the ability to charge mobile devices may be limited in such situations.

Thus, there is a need for a practical device for charging a mobile devices, such as Smartphones or Tablet Computers when traditional sources of electrical power are unavailable.

SUMMARY

In accordance with an aspect of the present disclosure, a mobile device charging apparatus includes a mobile device case including an electrical adapter configured to connect with a charging port of a mobile device. A gearbox is arranged in the case. The gearbox includes at least two interconnected gears. The gearbox is configured to generate electrical energy by rotating the interconnected gears. A mechanical crank is configured to rotate the interconnected gears of the gearbox to generate the electrical energy. A printed circuit board (PCB) is in electrical communication with the gearbox. The PCB is in electrical communication with the electrical adapter. A battery is in electrical communication with the PCB. The battery is configured to store the electrical energy generated by rotating the interconnected gears of the gearbox. The PCB is configured to charge the mobile device by transferring the stored electrical energy from the battery to the electrical adapter configured to connect with the charging port of the mobile device.

In some aspects, a charging port is in electrical communication with the PCB. The charging port is configured to provide electrical energy to the mobile device to charge the mobile device.

In some aspects, the charging port is a universal serial bus (USB) port.

In some aspects, the USB port is a USB-A port, a USB-B port, a USB-B mini port, a USB-B micro port, a USB-C port, or a lightning port.

In some aspects, at least one solar panel is arranged on the mobile device case. The solar panel is configured to provide electrical energy to the mobile device to charge the mobile device.

In some aspects, the PCB is configured to charge the mobile device using electrical energy generated by at least one of the mechanical crank, the charging port, or the solar panel(s).

In some aspects, the mechanical crank is configured to be removably coupled with the gearbox.

In some aspects, a cradle is formed in the mobile device case. The mechanical crank is a handle configured to be removably coupled with the gearbox. The cradle is configured to receive the handle when the handle is separated from the gearbox.

In some aspects, the handle is configured to be removably coupled with the gearbox through a mechanical connection, a snap-fit connection, or a magnetic connection.

In some aspects, the gearbox includes a generator configured to generate electrical energy when interconnected gears are rotated.

In some aspects, the PCB includes a bank of input capacitors configured to store electrical energy generated by the gearbox.

In some aspects, the PCB includes a super capacitor configured to receive the stored electrical energy from the input capacitors of the bank of input capacitors. The super capacitor is configured to charge the battery In some aspects, a DC/DC converter is arranged between the bank of input capacitors and the super capacitor.

In some aspects, the PCB includes a microcontroller storing software or firmware configured to control the operations of the PCB.

In some aspects, the PCB includes a boost circuit and/or a buck circuit.

In some aspects, the interconnected gears of the gearbox include at least one stepdown gear.

In some aspects, the mobile device charging apparatus includes a mobile device case insert. The electrical adapter configured to connect with a charging port of a mobile device extends from the mobile device case insert. The mobile device case insert supports the mobile device when the mobile device is arranged in the mobile device case.

In accordance with an aspect of the present disclosure, a mobile device charging apparatus includes a mobile device case including an electrical adapter configured to connect with a charging port of a mobile device. An access port is in electrical communication with the electrical adapter. A mechanical wheel is positioned in the mobile device case. The mechanical wheel is in electrical communication with the electrical adapter. A tether is in communication with the mechanical wheel. The tether is configured to translate a mechanical force to the mechanical wheel to generate electricity. The mechanical wheel is configured to provide an electrical current to the mobile device to charge the mobile device.

In some aspects, the mobile device is a Smartphone, Tablet, or Laptop Computer.

In some aspects, the access port is configured to connect accessory devices with the mobile device through the electrical adapter.

In some aspects, a handle is connected with the tether. The handle may be a ring. The ring may be shaped, dimensioned and positioned to embed in the mobile device case when not in use without protruding therefrom.

In some aspects, a crank indicator, such as a light, is configured to indicate when the electrical current is being provided to the mobile device to charge the mobile device.

In some aspects, a charge indicator light may indicate a plurality of charge levels of the mobile device.

In some aspects, a battery is positioned in the mobile device case. The battery is configured to store the electrical charge generated by the mechanical wheel. The battery may be electrically connected between the mechanical wheel and the electrical adapter. The battery may be configured to provide the electrical charge to the mobile device.

In some aspects, the battery may be a rechargeable lithium ion battery.

In some aspects, the mobile device case includes an upper housing and a lower housing. The upper and lower housings separate from each other to securely receive the mobile device in the mobile device case. A separation switch is configured to release the upper housing of the mobile device case from the lower housing of the mobile device case.

In some aspects, the mechanical wheel includes a reversing spring configured to bias the mechanical wheel toward a starting position. The reversing spring may be a torsion spring. The torsion spring may be positioned at a center of the wheel.

In some aspects, the torsion spring may be spaced apart from the center of the wheel and may include a second tether connected with a different part of the wheel from the tether.

In some aspects, the tether is configured to wind and unwind about the wheel in a reciprocal motion. The tether is configured to unwind from the wheel through an application of a first mechanical force applied to the tether by a user. The tether is configured to wind about the wheel through an application of a second mechanical force applied by the torsion spring.

BRIEF DESCRIPTION OF THE DRAWINGS

The accompanying drawings, which are incorporated in and constitute a part of this specification, illustrate embodiments of the present disclosure and, together with the detailed description below, serve to further explain the present disclosure, in which.

DETAILED DESCRIPTION

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

The phrases "wheel" and "mechanical wheel" may be used interchangeably herein.

Figure 1:
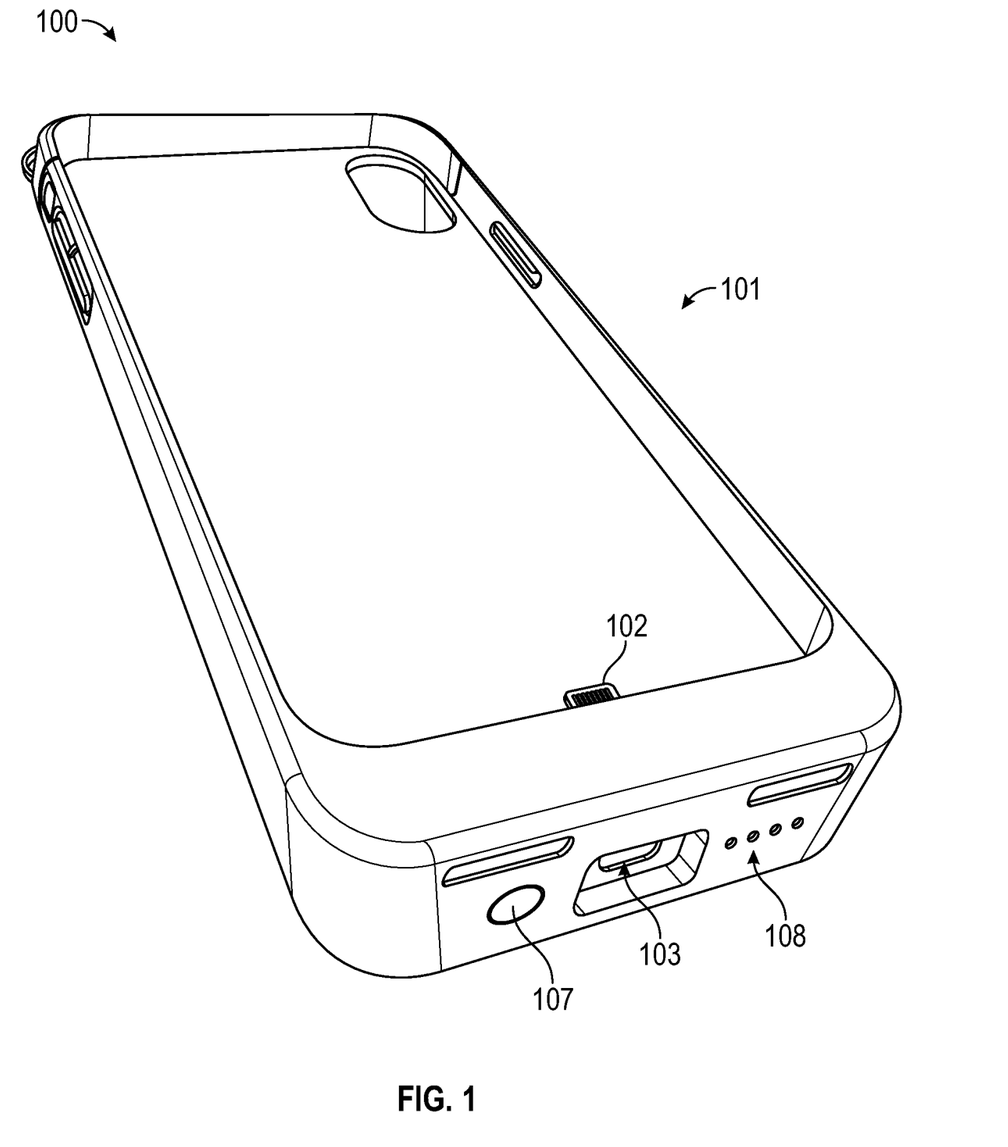
FIG. 1 is a first bottom perspective view of the mobile device charging apparatus according to an exemplary embodiment of the present disclosure.
Figure 2:
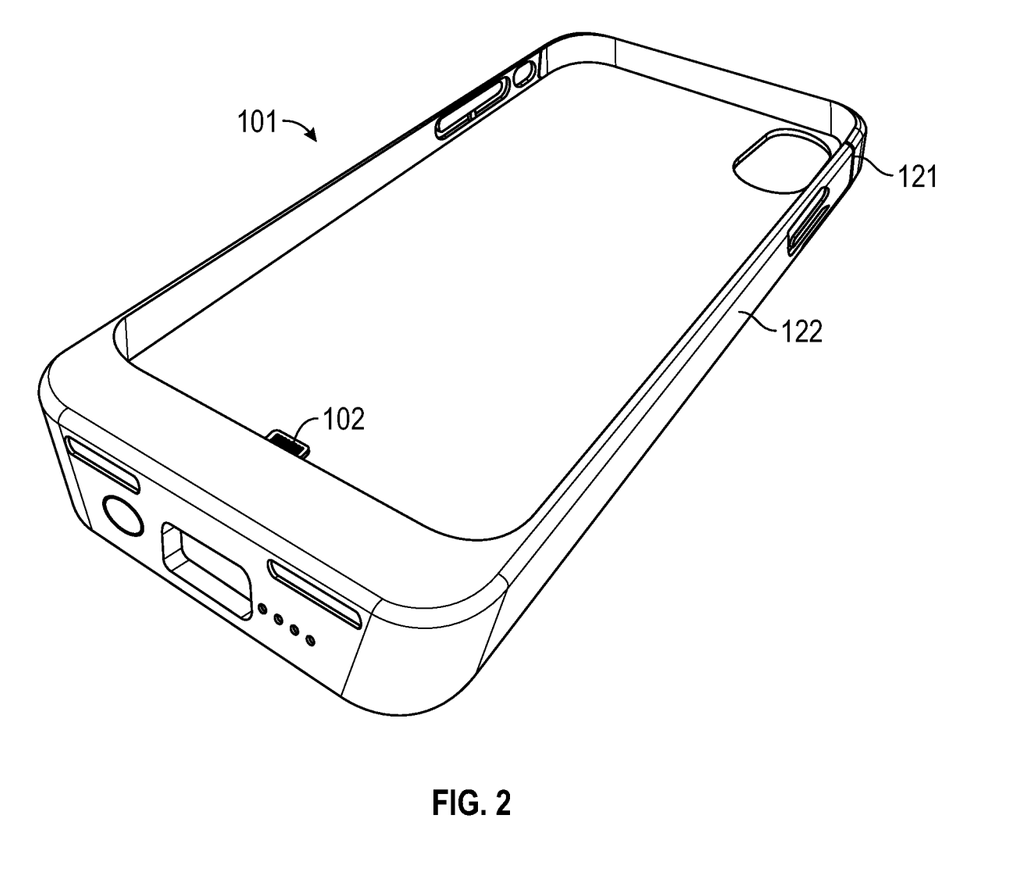
FIG. 2 is a second bottom perspective view of the mobile device charging apparatus according to an exemplary embodiment of the present disclosure.
Figure 3:
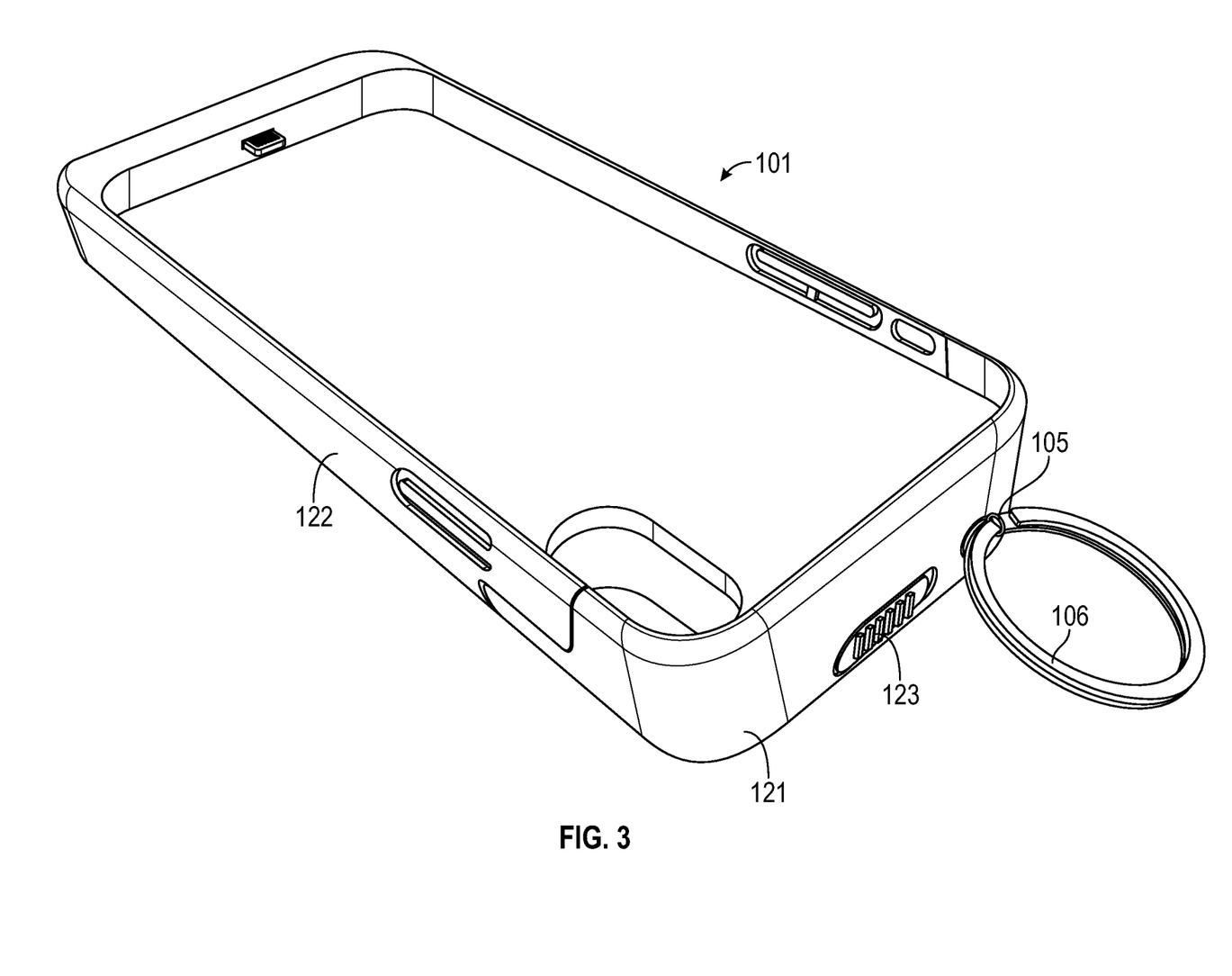
FIG. 3 is a top perspective view of the mobile device charging apparatus according to an exemplary embodiment of the present disclosure.
Figure 4:
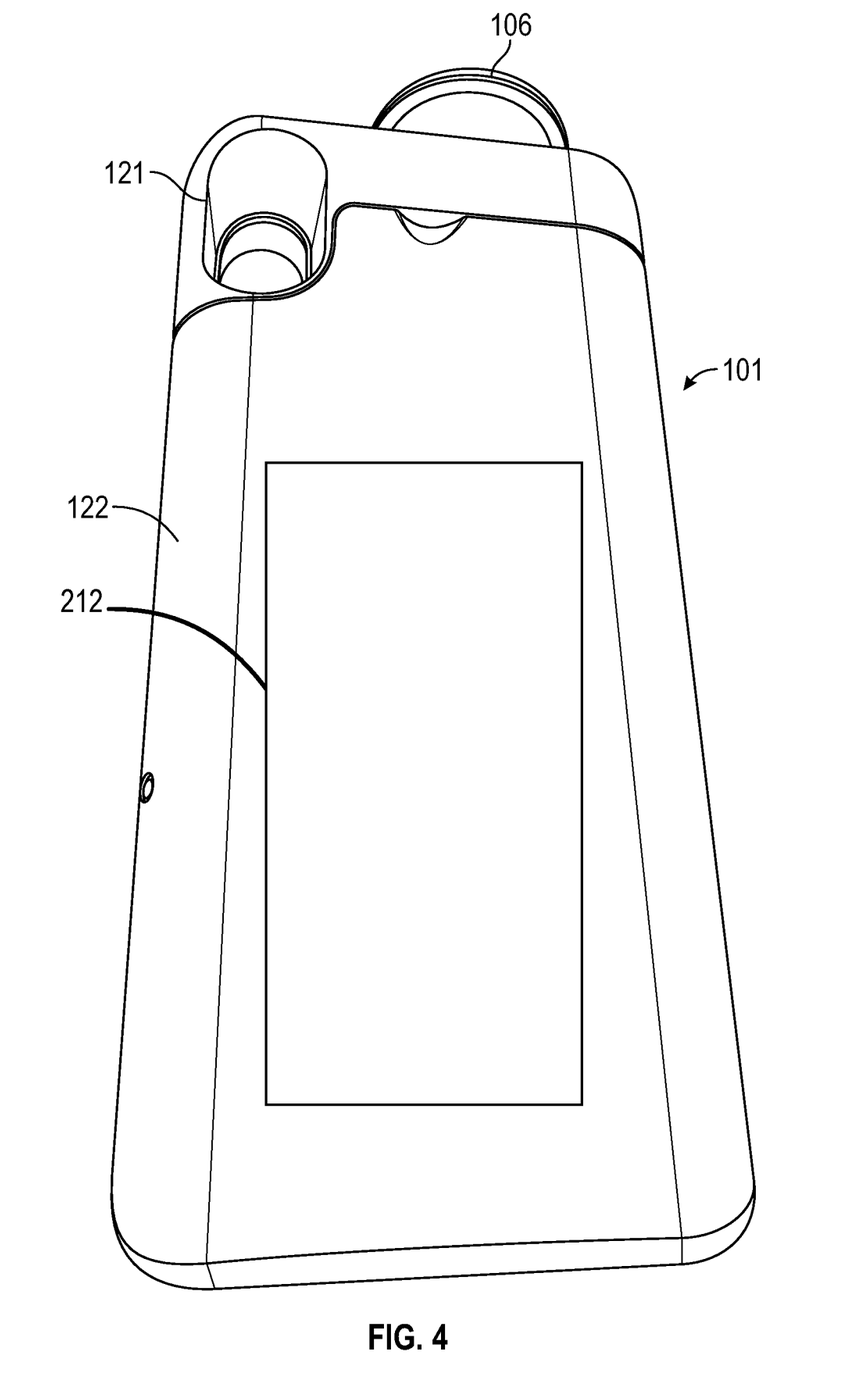
FIG. 4 is a rear plan view of the mobile device charging apparatus according to an exemplary embodiment of the present disclosure.
Figure 5:
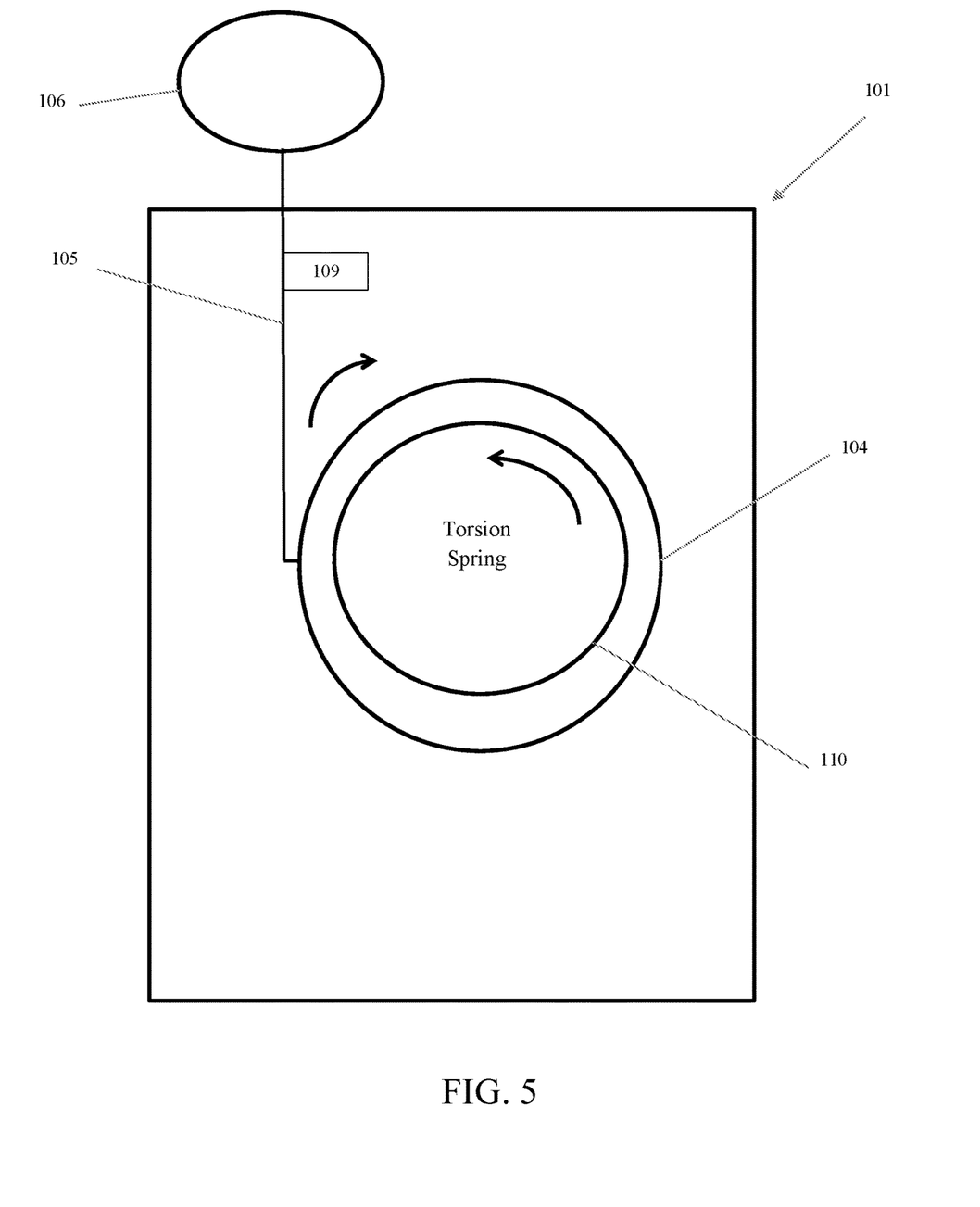
FIG. 5 is a first exemplary diagram of a mechanical wheel according to an exemplary embodiment of the present disclosure.
Figure 6:
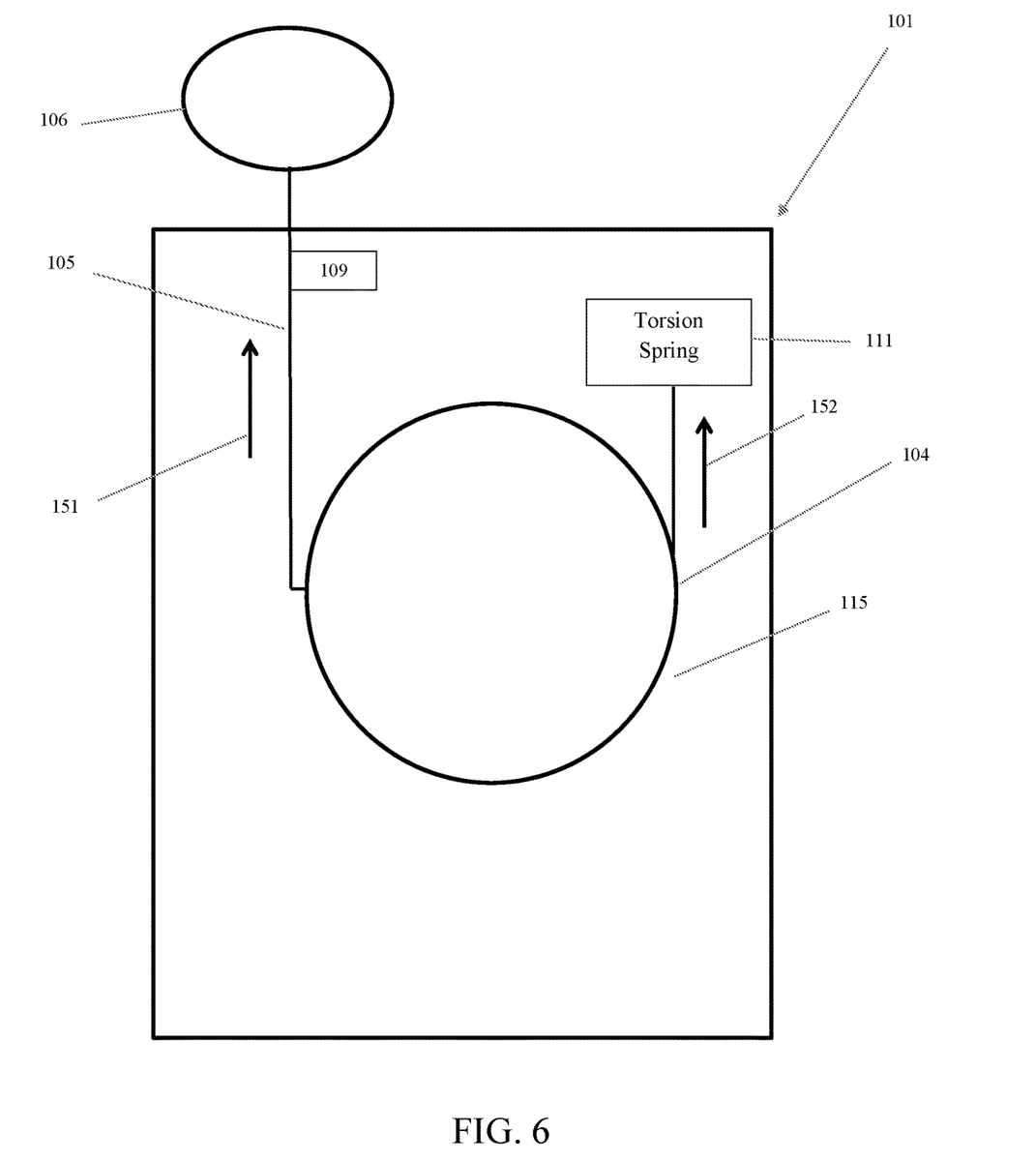
FIG. 6 is a second exemplary diagram of a mechanical wheel according to an exemplary embodiment of the present disclosure.

FIG. 1 is a first bottom perspective view of a mobile device charging apparatus 100 according to an exemplary embodiment of the present disclosure. FIG. 2 is a second bottom perspective view of the mobile device charging apparatus 100 according to an exemplary embodiment of the present disclosure. FIG. 3 is a top perspective view of the mobile device charging apparatus 100 according to an exemplary embodiment of the present disclosure. FIG. 4 is a rear plan view of the mobile device charging apparatus 100 according to an exemplary embodiment of the present disclosure. FIG. 5 is a first exemplary diagram of a mechanical wheel 104 according to an exemplary embodiment of the present disclosure. FIG. 6 is a second exemplary diagram of the mechanical wheel 104 according to an exemplary embodiment of the present disclosure.

Referring to FIGS. 1-6, according to an exemplary embodiment of the present disclosure, the mobile device charging apparatus 100 includes a mobile device case 101 including an electrical adapter 102 configured to connect with a charging port of a mobile device. An access port 103 is in electrical communication with the electrical adapter 102. A mechanical wheel 104 is positioned in the mobile device case 101. The mechanical wheel 104 is in electrical communication with the electrical adapter 102. A tether 105 is connected with the mechanical wheel 105. The tether 105 is configured to translate a mechanical force to the mechanical wheel 104 to generate electricity. That is, in use, by repeatedly pulling and releasing the tether 105 (e.g., by holding handle 106), a user can repeatedly crank the mechanical wheel 104 in a reciprocal motion (e.g., in a substantially circular rotation in forward and reverse directions) to generate an electrical current which is then passed on to the mobile device to charge the mobile device without the mobile device being plugged into a wall outlet or other standard charging source. This allows mechanical charging of the mobile device at any time, and without access to a traditional source of electrical power.

Thus, the mechanical wheel 104 may be repeatedly mechanically rotated by pulling the tether 105 to charge a mobile device connected with the mobile charging apparatus 100. This is particularly useful when access to electrical power, such as a wall outlet, is not available, such as following a natural disaster or in a region of the world in which an electrical grid is not consistently operational.

In an exemplary embodiment of the present disclosure, the mobile device is a Smartphone, Tablet, or Laptop Computer. For example, the mobile device may be stored in the mobile device charging apparatus 100 at all times, while still maintaining full operational access to all switches, and ports on the mobile device. This provides practical and always-available access to a charging solution for the mobile device. As illustrated, in FIGS. 1-4, all switches, ports, cameras, and the like remain accessible even when the mobile device is positioned in the mobile device charging apparatus described herein. For example, the access port 103 is configured to connect accessory devices with the mobile device through the electrical adapter 102.

In an exemplary embodiment of the present disclosure, a handle 106 is connected with the tether 105. The handle 106 may be a ring (see, e.g., FIG. 3); however, exemplary embodiments are not limited thereto. The ring may be shaped, dimensioned and positioned to embed in the mobile device case when not in use without protruding therefrom. For example, the tether 105 and the handle 106 may retract into an exterior wall of the mobile charging apparatus (e.g., an exterior wall of the upper housing 121) so as to not protrude from the mobile charging apparatus.

In an exemplary embodiment of the present disclosure, a crank indicator 107, such as a light, is configured to indicate when the electrical current is being provided to the mobile device to charge the mobile device. The light may include a plurality of lights indicating an amount of electrical energy that is being generated.

In an exemplary embodiment of the present disclosure, a series of lights may be employed as a charge indicator light 108 and may indicate a plurality of charge levels of the mobile device. For example, charge indicator lights may indicate any predetermined charging levels from 0-100% charged.

In an exemplary embodiment of the present disclosure, a battery 109 is positioned in the mobile device case 101. The battery 109 is configured to store the electrical charge generated by the mechanical wheel 104. The battery 109 may be electrically connected between the mechanical wheel 104 and the electrical adapter 102. The battery 109 may be configured to provide the electrical charge to the mobile device. The battery 109 may continue to store power even after the mobile device is 100% charged and may provide additional power to the battery 109 as the mobile device is used. The additional power may be provided as a trickle, or may be accessed on-demand (e.g., through activation of a battery activation switch). Thus, mechanical power generated when the mobile device is fully charged may be stored for later use, or a second mobile device may be charged by being placed in the mobile device charging apparatus 100.

In an exemplary embodiment of the present disclosure, the battery 105 may be a rechargeable lithium ion battery. However, exemplary embodiments are not limited thereto, and alternative batteries may be employed.

In an exemplary embodiment of the present disclosure, the mobile device case 101 includes an upper housing 121 and a lower housing 122. The upper and lower housings 121,122 separate from each other to securely receive the mobile device in the mobile device case 101. A separation switch 123 is configured to release the upper housing 121 of the mobile device case 101 from the lower housing 122 of the mobile device case 101.

In an exemplary embodiment of the present disclosure, the mechanical wheel 104 includes a reversing spring 110 configured to bias the mechanical wheel 104 toward a starting position. The reversing spring 110 may be a torsion spring (e.g., torsion spring 110 in FIG. 5 or torsion spring 111 in FIG. 6). The torsion spring 110 may be positioned at a center of the wheel 104 or the torsion spring 111 may be spaced apart from the wheel 104 and connected to the wheel by a second tether 115. The torsion spring (110 or 111) is configured to bias the mechanical wheel 104 to rotate in an opposite direction from a directly in which the tether 105 rotates the mechanical wheel 104.

In an exemplary embodiment of the present disclosure, the torsion spring 111 may be spaced apart from the center of the wheel and may include the second tether 115 connected with a different part of the wheel from the tether. The second tether 115 may be entirely concealed within the mobile device case 101 and might not be visible from outside the mobile device case 101.

In an exemplary embodiment of the present disclosure, the tethers (e.g., 105 and/or 115) is/are configured to wind and unwind about the wheel 104 in a reciprocal motion. The tether 105 is configured to unwind from the wheel 104 through an application of a first mechanical force 151 applied to the tether 105 by a user. The tether 105 is configured to rewind about the wheel 104 through an application of a second mechanical force 152 applied by the torsion spring (110 or 111) to the mechanical wheel 104.

The handle 106 may be repeatedly pulled and released to mechanically generate electrical energy in both extending and retracting directions, thus maximizing power generation efficiency.

Applicant has made the unexpected discovery that continually applying a mechanical force to the mechanical wheel 104 by repeating pulling and releasing the tether 105 can charge a mobile device such as a smartphone from about 1% charged to about 99% charge in approximately 60 minutes. This rate of charging exceeds the rate of charging found when a Smartphone is connected to a wall outlet using a standard USB adapter. Thus, the mobile charging apparatus 100 described herein provides a benefit of reduced charging time, as compared with traditional wall charging methods.

Referring to FIGS. 7-10, a mobile device charging apparatus 200 includes a mobile device case 201 including an electrical adapter 202 configured to connect with a charging port of a mobile device (see, e.g., smartphone 230). A gearbox 203 is arranged in the mobile device case 201. The gearbox 203 includes at least two interconnected gears (see, e.g., gears 204, 205 and/or 206 in FIG. 8). The gearbox 203 is configured to generate electrical energy by rotating the interconnected gears. The gearbox 203 may be secured to the mobile device case 201 by a housing 224. The housing 224 allows mechanical/manual rotation of the interconnected gears (e.g., gears 204, 205 and/or 206) to generate an electrical current that can be used and/or stored for charging a mobile device. The gearbox 203 may include at least one stepdown gear (see, e.g., gear 205) defining a size smaller than the other gears of the gearbox 203, which can be employed to generate electrical power more efficiently, such as by translating rotational force to generator 214.

In some aspects of the present disclosure, the gearbox 203 includes the generator 214 (see, e.g., FIG. 8) configured to generate electrical energy when interconnected gears of the gearbox 203 are rotated. The generator 214 may be supported by housing 224.

Figure 7:
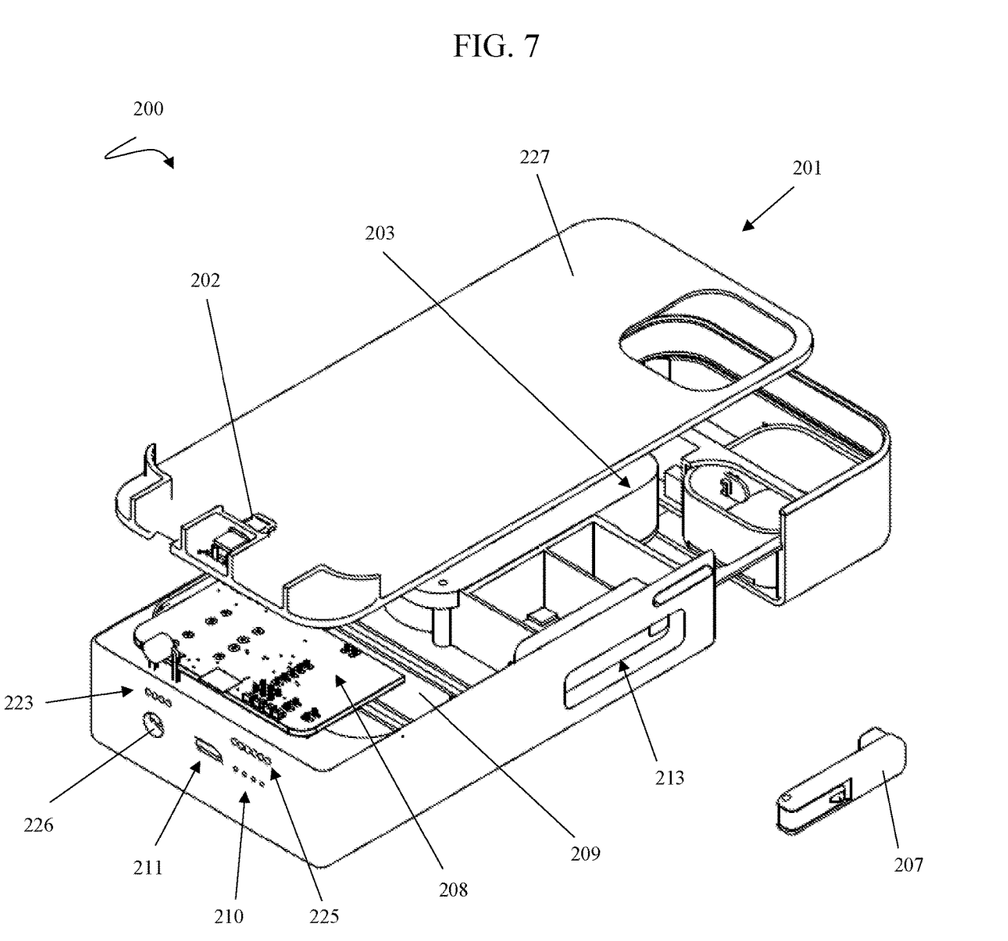
FIG. 7 is an exploded, front perspective view of a mobile device charging apparatus according to an exemplary embodiment of the present disclosure.
Figure 8:
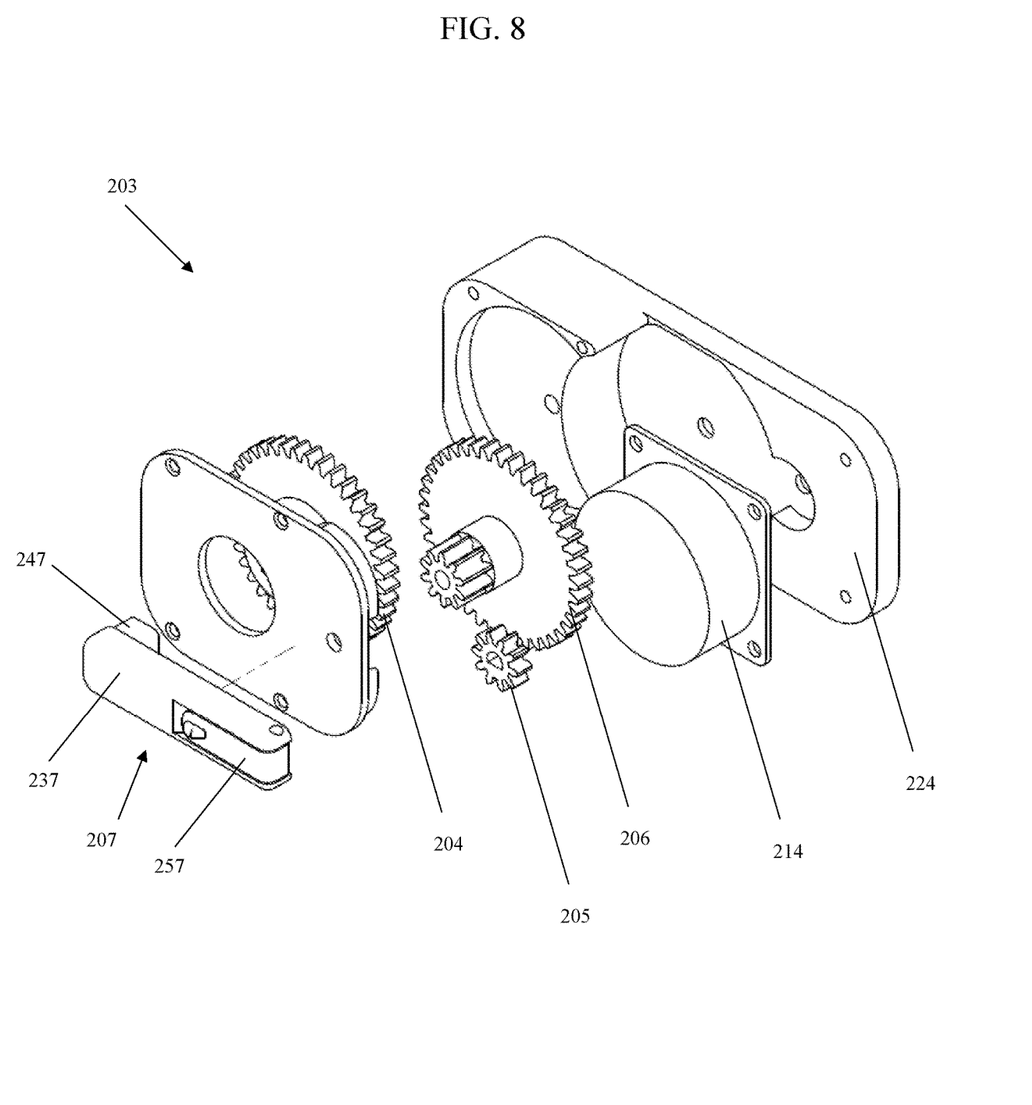
FIG. 8 is an exploded, perspective view of the gearbox of the mobile device charging apparatus of FIG. 7.

A mechanical crank 207 is configured to rotate the interconnected gears of the gearbox 203 to generate the electrical energy. The mechanical crank 203 may be a handle that is operably coupled with the gearbox 203 and that can be gripped and rotated by a user to rotate the gears of the gearbox 203. The mechanical crank 203 may be removably coupled with the gearbox 203 or may be rotatably and operably affixed to at least one of the gears of the gearbox 203.

The mechanical crank 207 may include a first arm 237 and a protrusion 247 extending from the first arm 237 and configured to connect with the gearbox 203. The mechanical crank 207 may include a second arm 257 operably coupled with the first arm 237. The second arm 257 may be pivotably coupled with the first arm 237 or rotatably coupled with the first arm 237 to allow the mechanical crank 207 to be spun within a user's fingers or hand to rotate the gears of the gearbox 203. The second arm 257 may be configured to fold into the first arm 237, such as for storage.

In some aspects of the present disclosure, a cradle 213 is formed in the mobile device case 201. The cradle 213 is configured to receive, hold, and store the mechanical crank 207 when the mechanical crank 207 is separated from the gearbox 203.

The mechanical crank 207 may be configured to be removably coupled with the gearbox 203 through a mechanical connection, a snap-fit connection, or a magnetic connection. For example, the protrusion 247 of the mechanical crank 207 may be removably received in the gearbox 203 and connected by a mechanical (e.g., a lock and key) connection, a snap-fit connection or a magnetic connection.

A printed circuit board (PCB) 208 is in electrical communication with the gearbox 203. The PCB 208 is in electrical communication with the electrical adapter 202. A battery 209 is in electrical communication with the PCB 208. The battery 209 is configured to store the electrical energy generated by rotating the interconnected gears of the gearbox 203 and transfer the stored electrical energy to the battery 209 under control of the PCB 208. The battery 209 may be a rechargeable battery, such as a lithium-ion battery or a lithium polymer battery.

The PCB 208 is configured to charge the mobile device (e.g., smartphone 230) by transferring the stored electrical energy from the battery 209 to the electrical adapter 202 configured to connect with the charging port of the mobile device. That is, the PCB 208 is configured to control a flow of electrical energy to and/or from the battery 209 to either charge the battery 209 or discharge the stored power in the battery 209 to charge a mobile device connected with the mobile device case 201.

In some aspects of the present disclosure, the mobile device case 201 may include a charging port 211 in electrical communication with the PCB 208. The charging port 211 of the mobile device case 201 is configured to provide electrical energy to the mobile device to charge the mobile device.

As an example, the charging port may be a universal serial bus (USB) port. For example, the USB port may be a USB-A port, a USB-B port, a USB-B mini port, a USB-B micro port, a USB-C port, or a lightning port.

In some aspects of the present disclosure, at least one solar panel (see, e.g., solar panel 212 in FIG. 4) is arranged on the mobile device case 201. The solar panel is configured to provide electrical energy to the mobile device to charge the mobile device.

In use, the PCB 208 is configured to charge the mobile device using electrical energy generated by at least one of the mechanical crank 207/gearbox 203, the charging port 211, and/or the solar panel(s) 212. That is, any one of the mechanical crank 207/gearbox 203, the charging port 211, and/or the solar panel(s) 212, either individually or by utilizing any combination thereof, can be employed to charge the mobile device, such as smartphone 230.

Figure 9:
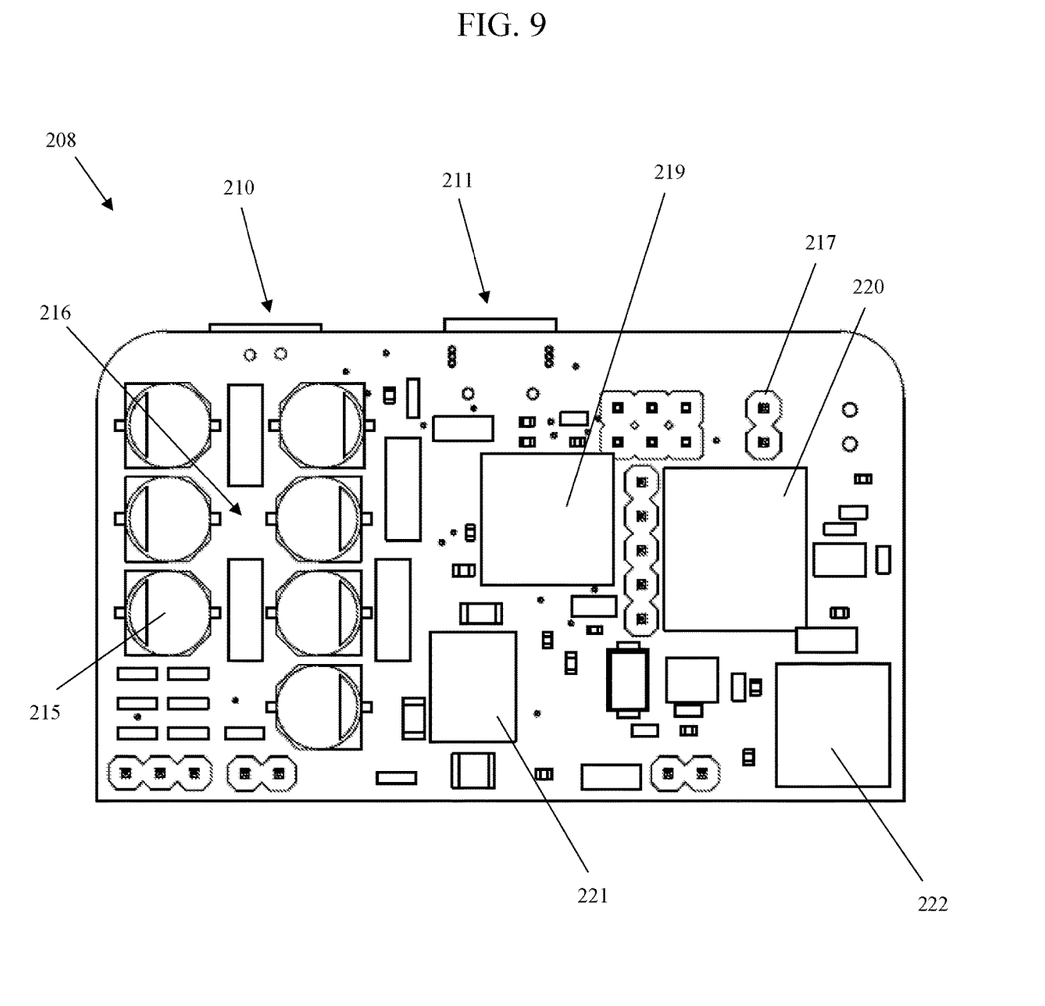
FIG. 9 is a schematic view of a printed circuit board (PCB) of the mobile device charging apparatus of FIG. 7
Figure 10A:
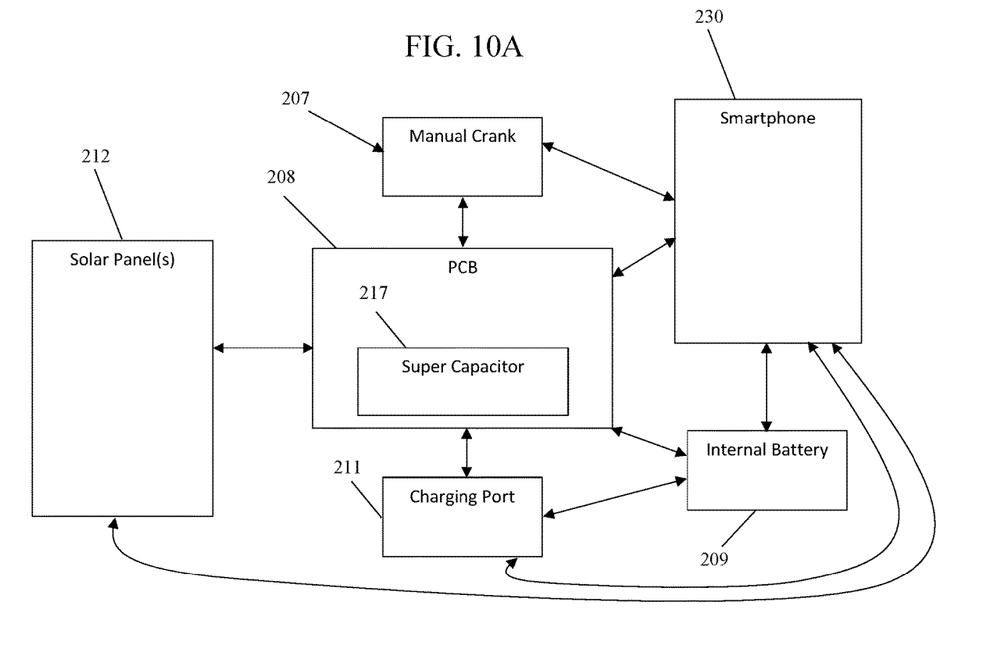
FIG. 10A is a flow chart of electrical connections between the components of the mobile device charging apparatus of FIG. 7.
Figure 10B:
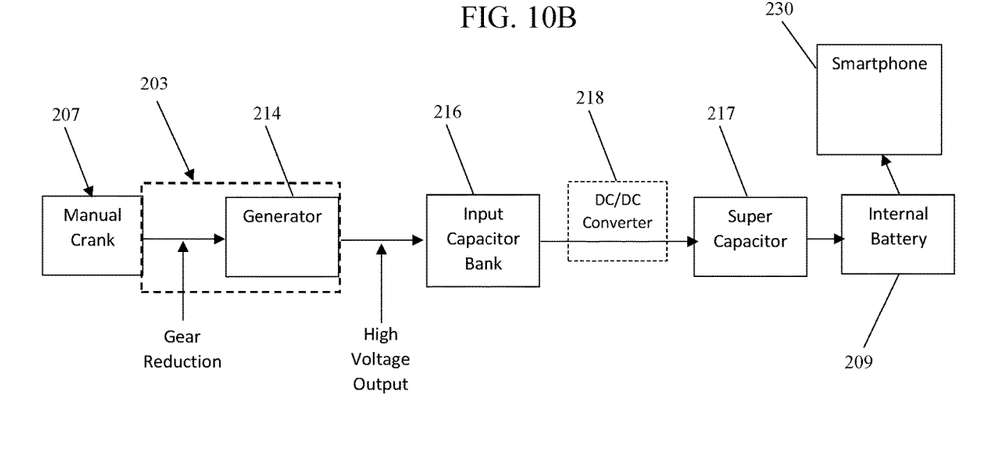
FIG. 10B is a flow chart illustrating a power generation and charging scheme of the mobile device charging apparatus of FIG. 7.

Referring particularly to FIGS. 9, 10A, and 10B, the PCB 208 includes a bank of input capacitors 216, and each input capacitor 215 of the bank of input capacitors 216 is configured to store electrical energy generated by the mechanical crank 207/gearbox 203, the charging port 211, and/or the solar panel(s) 212.

The PCB may include a super capacitor 217 configured to receive the stored electrical energy from the input capacitors 215 of the bank of input capacitors 216. The super capacitor 217 is configured to charge the battery 209 and/or to charge the mobile device directly by applying electrical power directly from the super capacitor 217 to the mobile device.

As an example, the super capacitor 217 may be an electrochemical double layer capacitor (EDLC), a pseudocapacitor, or a hybrid-type capacitor formed by a combination of an EDLC and a pseudocapacitor.

In some aspects of the present disclosure, a DC/DC converter 218 is arranged between the bank of input capacitors 216 and the super capacitor 217. The DC/DC converter 218 may be an electronic circuit or electromechanical device that converts a source of direct current (DC) from one voltage level to another.

In some aspects of the present disclosure, the PCB 208 includes a microcontroller 219 storing software or firmware configured to control the operations of the PCB 208.

In some aspects of the present disclosure, the PCB 208 includes a boost circuit 220 and/or a buck circuit 221. The boost circuit 220 may be a DC-to-DC power converter that can be employed to step up voltage (e.g., while also stepping down current) from its input (i.e., supply) to its output (i.e., load). The boost circuit 220 may be a switched-mode power supply (SMPS) containing at least two semiconductors (e.g., a diode and a transistor) and one or more energy storage elements, such as a capacitor, inductor, or a combination of a capacitor and an inductor. To reduce voltage ripple, filters including capacitors (and possibly in combination with inductors) may be added to the converter's output (e.g., load-side filter) and input (e.g., supply-side filter). The buck circuit 221 may be a DC-to-DC converter which steps down voltage (e.g., while stepping up current) from its input (i.e., supply) to its output (i.e., load). The buck circuit 221 may be an SMPS. The buck circuit 221 provides much greater power efficiency as DC-to-DC converters than linear regulators, which are simpler circuits that can lower voltages by dissipating power as heat, but do not step-up output current.

In some aspects of the present disclosure, the PCB 208 includes battery charger 222. The battery charger 222 may control the charging of the battery 209.

Referring particularly to FIG. 7, the mobile device 101 case may include one or more speaker orifices 223 and 225 configured to allow sound to transmit from the mobile device in the mobile device case 101 to outside the mobile device case 101. The mobile device case 101 may include a manual on/off switch 226 to turn on or off the functions of the mobile device case 101.

In some aspects of the present disclosure, the mobile device charging apparatus 200 includes a mobile device case insert 227. The electrical adapter 202 configured to connect with a charging port of a mobile device extends from the mobile device case insert 227. The mobile device case insert 227 supports the mobile device when the mobile device is arranged in the mobile device case. The mobile device case insert 227 is configured to be removably arranged within mobile device case 201.

In use, the mobile device charging apparatus 200 can operate in at least one of three charging modes to charge battery 209 and/or to directly power a mobile device, such as the smartphone 230. The modes noted below may also be employed in any desired combination to charge or power the mobile device. The three charging modes include charging port input mode (e.g., USB input), in which external elegy electrical power is provided to charge the battery 209 and/or to directly power the mobile device through charging port 211, solar power mode in which the solar panel(s) 212 are employed to charge the battery 209 and/or to directly power the mobile device, and crank input mode in which the manual crank 207 is employed to charge the battery 209 and/or to directly power the mobile device, as described herein.

The mobile device charging apparatuses 100 or 200 described herein may include, or may be connected with (e.g., through a wired or wireless connection) a computer, such as the computer described in more detail below with reference to FIG. 11, such as to control the functions of the mobile device charging apparatuses 100 or 200, or to update software or firmware stored in the mobile device charging apparatuses 100 or 200.

Figure 11:
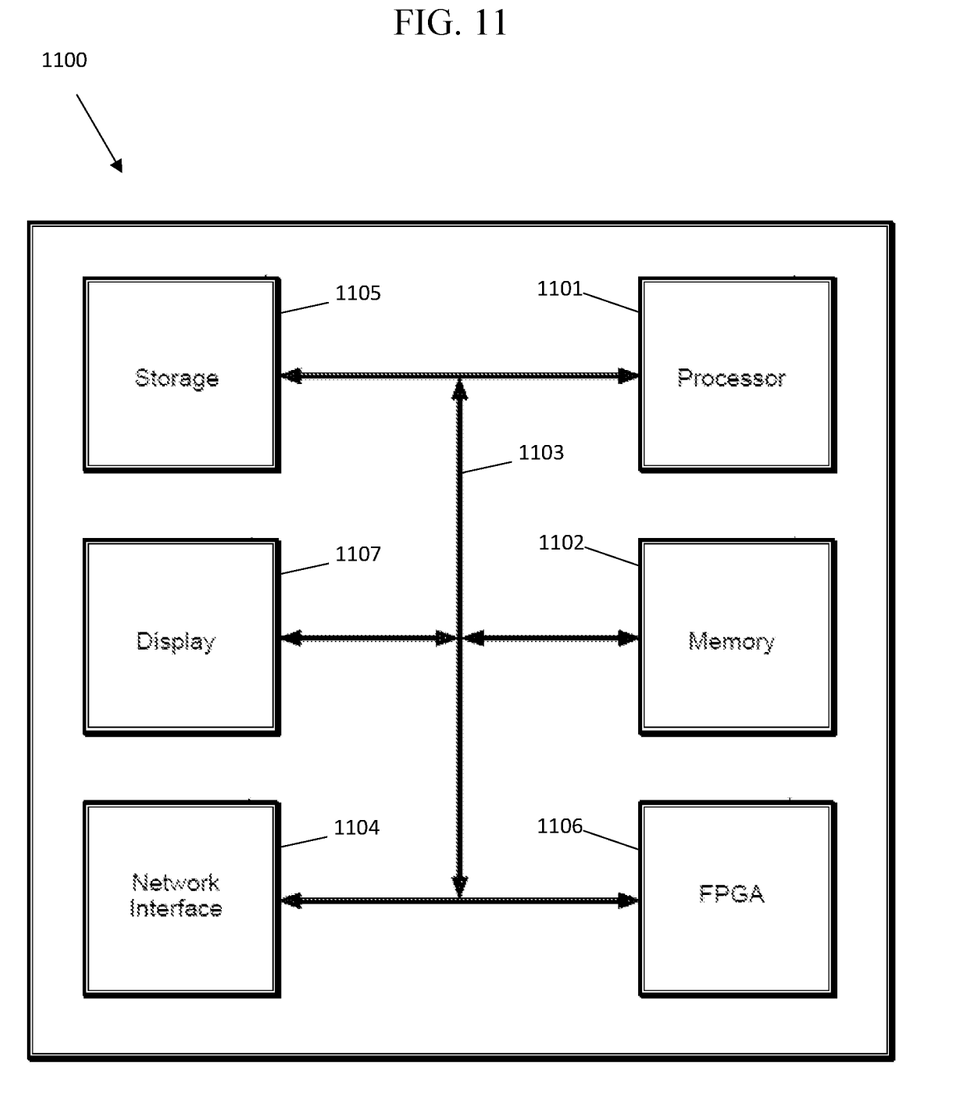
FIG. 11 is a block diagram of an exemplary computer employable by the devices and/or systems described herein according to aspects of the present disclosure.

Referring to FIG. 11, a general-purpose computer 1100 is described. The general-purpose computer 1100 can be employed to perform the various functions described herein. The computer 1100 may include a processor 1101 connected to a computer-readable storage medium or a memory 1102 which may be a volatile type memory, e.g., RAM, or a non-volatile type memory, e.g., flash media, disk media, etc. The processor 1101 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 1102 can be random access memory, read-only memory, magnetic disk memory, solid state memory, optical disc memory, and/or another type of memory. The memory 1102 can communicate with the processor 1101 through communication buses 1103 of a circuit board and/or through communication cables such as serial ATA cables or other types of cables. The memory 1102 includes computer-readable instructions that are executable by the processor 1101 to operate the computer 1100 to execute the various functions described herein. The computer 1100 may include a network interface 1104 to communicate (e.g., through a wired or wireless connection) with other computers or a server. A storage device 1105 may be used for storing data. The computer 1100 may include one or more FPGAs 1106. The FPGAs 1106 may be used for executing various functions described herein. A display 1107 may be employed to display data processed by the computer 1100.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A mobile device charging apparatus, comprising:
a mobile device case including an electrical adapter configured to connect with a charging port of a mobile device;
a gearbox arranged in the mobile device case, wherein the gearbox includes at least two interconnected gears, and wherein the gearbox is configured to generate electrical energy by rotating the at least two interconnected gears;
a mechanical crank configured to rotate the at least two interconnected gears of the gearbox to generate the electrical energy, wherein the mechanical crank is configured to be removably coupled with the gearbox, wherein the mechanical crank includes a first arm and a second arm operably coupled with the first arm, wherein the second arm is configured to be gripped between the user's fingers to rotate the mechanical crank;
a recessed cradle defined in the mobile device case, wherein the recessed cradle defines a shape corresponding with a shape defined by the mechanical crank, wherein the cradle is configured to receive the mechanical crank therein when the mechanical crank is not coupled with the gearbox;
a printed circuit board (PCB) in electrical communication with the gearbox and in electrical communication with the electrical adapter; and
at least one battery in electrical communication with the PCB, wherein the at least one battery is configured to store the electrical energy generated by rotating the at least two interconnected gears of the gearbox,
wherein the PCB is configured to charge the mobile device by transferring the stored electrical energy from the at least one battery to the electrical adapter configured to connect with the charging port of the mobile device.

2. The apparatus according to claim 1, wherein the mobile device is a Smartphone, Tablet, or Laptop Computer.

3. The apparatus according to claim 1, further including a crank indicator configured to indicate when the electrical current is being provided to the mobile device to charge the mobile device, wherein the crank indicator includes a plurality of lights indicating an amount of electrical energy that is being generated by the manual crank.

4. The apparatus according to claim 1, further including a charging port in electrical communication with the PCB, wherein the charging port is configured to provide electrical energy to the mobile device to charge the mobile device.

5. The apparatus according to claim 4, wherein the charging port is a universal serial bus (USB) port.

6. The apparatus according to claim 5, wherein the USB port is a USB-A port, a USB-B port, a USB-B mini port, a USB-B micro port, a USB-C port, or a lightning port.

7. The apparatus according to claim 1, further including at least one solar panel arranged on the mobile device case, wherein the at least one solar panel is configured to provide electrical energy to the mobile device to charge the mobile device.

8. The apparatus according to claim 1, further including:
a charging port in electrical communication with the PCB, wherein the charging port is configured to provide electrical energy to the mobile device to charge the mobile device; and
at least one solar panel arranged on the mobile device case, wherein the at least one solar panel is configured to provide electrical energy to the mobile device to charge the mobile device,
wherein the PCB is configured to charge the mobile device using electrical energy generated by at least one of the mechanical crank, the charging port, or the at least one solar panel.

9. The apparatus according to claim 1, wherein the handle is configured to be removably coupled with the gearbox through a mechanical connection, a snap-fit connection, or a magnetic connection.

10. The apparatus according to claim 1, wherein the gearbox includes at least one generator configured to generate electrical energy when the at least two interconnected gears are rotated.

11. The apparatus according to claim 1, wherein the PCB includes a plurality of input capacitors configured to store electrical energy generated by the gearbox.

12. The apparatus according to claim 11, wherein the PCB includes a super capacitor configured to receive the stored electrical energy from the input capacitors of the plurality of input capacitors, and wherein the super capacitor is configured to charge the at least one battery.

13. The apparatus according to claim 12, further including a DC/DC converter arranged between the plurality of input capacitors and the super capacitor.

14. The apparatus according to claim 1, wherein the PCB further includes at least one microcontroller.

15. The apparatus according to claim 14, wherein the PCB further includes at least one of a boost circuit or a buck circuit.

16. The apparatus according to claim 1, wherein the at least two interconnected gears of the gearbox include at least one stepdown gear.

17. The apparatus according to claim 1, further including a mobile device case insert, wherein the electrical adapter configured to connect with a charging port of a mobile device extends from the mobile device case insert, wherein the mobile device case insert is configured to support the mobile device when the mobile device is arranged in the mobile device case.

18. The apparatus according to claim 1, further including a crank indicator configured to indicate when the electrical current is being provided to the mobile device to charge the mobile device, wherein the crank indicator includes a plurality of lights indicating an amount of electrical energy that is being generated by the manual crank, and wherein the plurality of lights are configured to indicate an amount of charge stored in the at least one battery.

19. The apparatus according to claim 1, wherein the second arm of the mechanical crank is rotatably coupled with the first arm of the mechanical crank.

20. The apparatus according to claim 1, wherein the second arm of the mechanical crank is pivotably coupled with the first arm of the mechanical crank, and wherein the second arm of the mechanical crank is configured to fold into the first arm of the mechanical crank.

* * * * *